United States Patent
Togashi et al.

(10) Patent No.: US 7,420,795 B2
(45) Date of Patent: Sep. 2, 2008

(54) MULTILAYER CAPACITOR

(75) Inventors: Masaaki Togashi, Tokyo (JP); Yoshitomo Matsushita, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/902,287

(22) Filed: Sep. 20, 2007

(65) Prior Publication Data

US 2008/0080122 A1    Apr. 3, 2008

(30) Foreign Application Priority Data

Sep. 28, 2006   (JP)   ............................. 2006-265306

(51) Int. Cl.
   *H01G 4/228*   (2006.01)
(52) U.S. Cl. ................. 361/306.3; 361/306.1; 361/307; 361/308.1; 361/321.1; 361/313
(58) Field of Classification Search ............. 361/306.3, 361/306.1, 307, 308.1, 308.2, 311–313, 302–305, 361/321.1, 321.2
See application file for complete search history.

(56) References Cited

U.S. PATENT DOCUMENTS

| | | | |
|---|---|---|---|
| 6,191,932 B1 * | 2/2001 | Kuroda et al. | ............... 361/303 |
| 6,430,025 B2 * | 8/2002 | Naito et al. | ................. 361/303 |
| 6,700,772 B2 * | 3/2004 | Raghavendra et al. | ..... 361/321.2 |
| 6,940,710 B1 * | 9/2005 | Lee et al. | ................. 361/321.2 |
| 7,154,374 B2 * | 12/2006 | Ritter et al. | ................. 338/323 |
| 7,277,270 B2 * | 10/2007 | Sato et al. | ................ 361/321.1 |

FOREIGN PATENT DOCUMENTS

JP    A 9-148174    6/1997

* cited by examiner

*Primary Examiner*—Nguyen T Ha
(74) *Attorney, Agent, or Firm*—Oliff & Berridge, PLC

(57) ABSTRACT

A multilayer capacitor comprises a capacitor body, a first connecting conductor arranged on a first side face of the capacitor body, first and second terminal electrodes, and a first insulator arranged between the first connecting conductor and first terminal electrode. The capacitor body has a plurality of laminated insulator layers and a plurality of first and second inner electrodes. The second terminal electrode is connected to the second inner electrode. Each of the first inner electrodes has a first lead portion exposing an end to the first side face. At least one of the first inner electrodes also has a second lead portion whose end is exposed to the first side face. The first connecting conductor continuously covers all the ends of the first lead portions of the first inner electrodes and mechanically connects with the ends of the first lead portions. The first terminal electrode continuously covers the whole area of the first insulator and the ends of the second lead portions of the first inner electrodes exposed to the first side face, and is electrically connected to the second lead portions of the first inner electrodes.

2 Claims, 4 Drawing Sheets

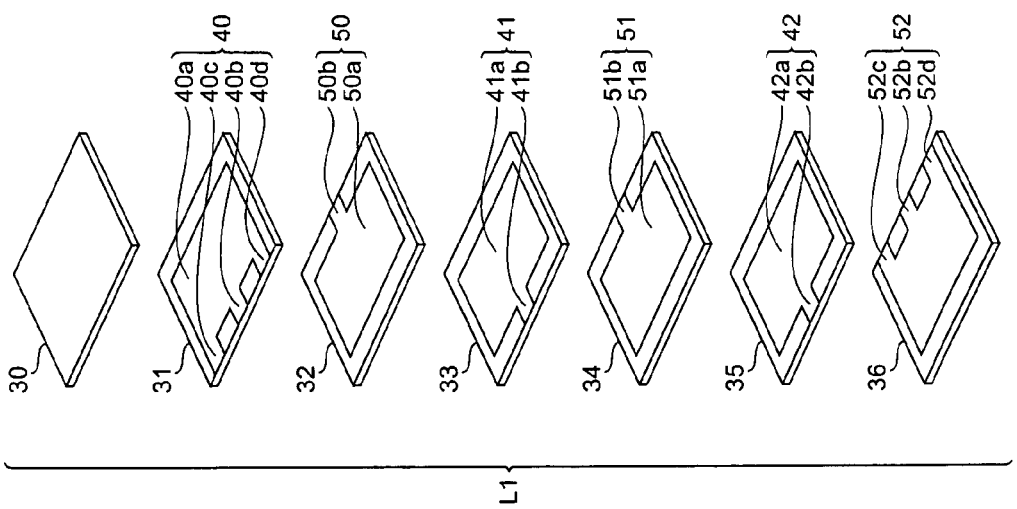
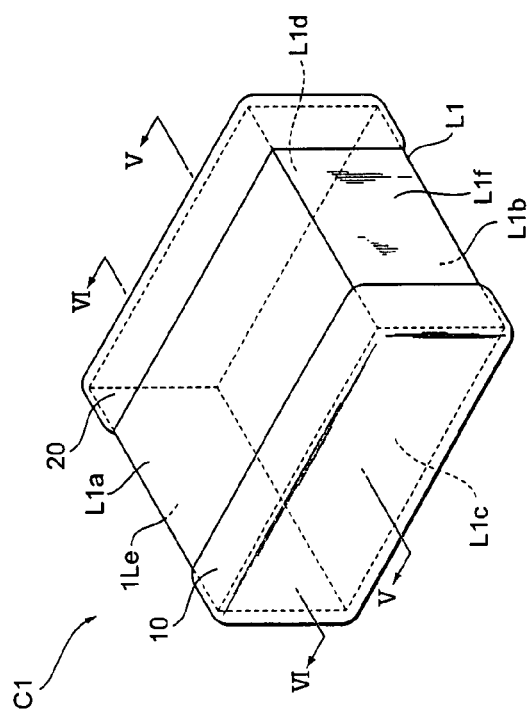

MULTILAYER CAPACITOR

BACKGROUND OF THE INVENTION

1. Field of the Invention

The present invention relates to a multilayer capacitor.

2. Related Background Art

Known as this kind of multilayer capacitor is one comprising a rectangular parallelepiped capacitor body having a pair of oblong main faces opposing each other, a pair of side faces extending in a longer side direction of the pair of main faces so as to connect the pair of main faces to each other and opposing each other, and a pair of side faces extending in a shorter side direction of the pair of main faces so as to connect the pair of main faces to each other and opposing each other; and a plurality of terminal electrodes arranged on the pair of side faces extending in the longer side direction of the main faces; wherein the capacitor body has a plurality of insulator layers laminated in a direction in which the pair of main faces oppose each other, and a plurality of inner electrodes arranged such that each adjacent pair oppose each other with at least one insulator layer therebetween (see, for example, Patent Document 1). In the multilayer capacitor described in Patent Document 1, the distance between the respective terminal electrodes arranged on a pair of side faces is short, so that the current path in the multilayer capacitor becomes relatively short, whereby equivalent series inductance (ESL) can be made smaller.

[Patent Document 1] Japanese Patent Application Laid-Open No. HEI 9-148174

SUMMARY OF THE INVENTION

Meanwhile, there are further demands for increasing equivalent series resistance (ESR) in multilayer capacitors depending on their uses. For example, the following demands exist when using a multilayer capacitor as a decoupling capacitor. Power supplies for central processing units (CPUs) mounted in digital electronic devices have been lowering their voltage while increasing their load current. This has made it very difficult to suppress fluctuations in the power supply voltage under a tolerable level upon drastic changes in the load current, whereby a multilayer capacitor known as decoupling capacitor has come into connection with the power supplies. When the load current fluctuates transiently, a current is supplied from this multilayer capacitor to the CPUs, so as to suppress the fluctuation in the power supply voltage. Recently, as the CPUs have been further raising their frequency, the load current has been becoming faster and greater, whereby the multilayer capacitor used for the decoupling capacitor has been demanded to increase its capacity and equivalent series resistance.

However, the multilayer capacitor described in Patent Document 1 has no consideration for increasing the equivalent series resistance.

It is an object of the present invention to provide a multilayer capacitor which can enhance the equivalent series resistance while keeping the equivalent series inductance from increasing.

The multilayer capacitor in accordance with the present invention comprises a rectangular parallelepiped capacitor body having oblong first and second main faces opposing each other, first and second side faces extending in a longer side direction of the first and second main faces, connecting the first and second main faces to each other and opposing each other, and third and fourth side faces extending in a shorter side direction of the first and second main faces, connecting the first and second main faces to each other and opposing each other, a plurality of insulator layers being laminated in an opposing direction of the first and second main faces; a plurality of first inner electrodes arranged within the capacitor body; a plurality of second inner electrodes alternately arranged with the plurality of first inner electrodes within the capacitor body such that each pair of the first and second inner electrodes adjacent to each other oppose each other with at least one of the plurality of insulator layers therebetween; a first terminal electrode electrically connected to the plurality of first inner electrodes; a second terminal electrode electrically connected to the plurality of second inner electrodes; a connecting conductor electrically connected to the plurality of first inner electrodes; and an insulator arranged between the first terminal electrode and connecting conductor; wherein the insulator covers the whole area of the connecting conductor; wherein the second terminal electrode is arranged on the second side face of the capacitor body; wherein each of the first inner electrodes includes a main electrode portion and a first lead portion extending from the main electrode portion; wherein an end of each first lead portion is exposed to the first side face; wherein at least one first inner electrode out of the plurality of first inner electrodes further includes a second lead portion extending from the main electrode portion; wherein an end of the second lead portion is exposed to the first side face; wherein the connecting conductor is arranged between the first terminal electrode and first side face wherein the connecting conductor continuously covers all the ends of the first lead portions of the plurality of first inner electrodes exposed to the first side face of the capacitor body without covering the end of the second lead portion of the at least one first inner electrode exposed to the first side face of the capacitor body, and be mechanically connected to the ends of the first lead portions; wherein the insulator is kept from covering the end of the second lead portion of the at least one first inner electrode exposed to the first side face of the capacitor body; and wherein the first terminal electrode is arranged on the first side face, continuously cover the whole area of the insulator and the end of the second lead portion of the at least one first inner electrode exposed to the first side face, and is electrically connected to the second lead portion of the first inner electrode.

In the above-mentioned multilayer capacitor, the first inner electrodes are electrically connected to each other through the connecting conductor. The connecting conductor is covered with the insulator, and is electrically insulated from the first terminal electrode. Therefore, out of the plurality of first inner electrodes, only at least one first inner electrode further including the second lead portion is directly electrically connected to the first terminal electrode without the aid of other inner electrodes. As a result, the above-mentioned multilayer capacitor can enhance the equivalent series resistance. Further, the first and second terminal electrodes are respectively arranged on the first and second side faces extending in the longer side direction of the first and second main faces and opposing each other. Thus, in the above-mentioned multilayer capacitor, the distance between the first and second terminal electrodes becomes shorter, so that the current path in the multilayer capacitor becomes relatively short, whereby the equivalent series inductance can be made smaller. The above-mentioned multilayer capacitor is equipped with the insulator for covering the connecting conductor connecting with the first inner electrodes. Therefore, the above-mentioned multilayer capacitor can be mounted to a substrate or the like without taking account of the connecting relationship between the connecting conductor and land patterns, thus achieving versatility.

Preferably, the multilayer capacitor further comprises a base conductor mechanically connected to the end of the second lead portion of the at least one first inner electrode exposed to the first side face; wherein the base conductor is arranged between the first side face and first terminal electrode and covers the end of the second lead portion of the first inner electrode exposed to the first side face without overlapping the connecting conductor on the first side face. For example, when forming the connecting conductor by baking a metal material onto the first side face, this can favorably restrain the end of the second lead portion of the first inner electrode exposed to the first side face from oxidizing at the time of baking.

The present invention can provide a multilayer capacitor which can enhance the equivalent series resistance while keeping the equivalent series inductance from increasing.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 1 is a perspective view of the multilayer capacitor in accordance with an embodiment;

FIG. 2 is an exploded perspective view of the capacitor body included in the multilayer capacitor in accordance with the embodiment;

DESCRIPTION OF THE PREFERRED EMBODIMENTS

In the following, a preferred embodiment will be explained in detail with reference to the accompanying drawings. In the explanation, the same constituents or those having the same functions will be referred to with the same numerals while omitting their overlapping descriptions.

Figure 3:
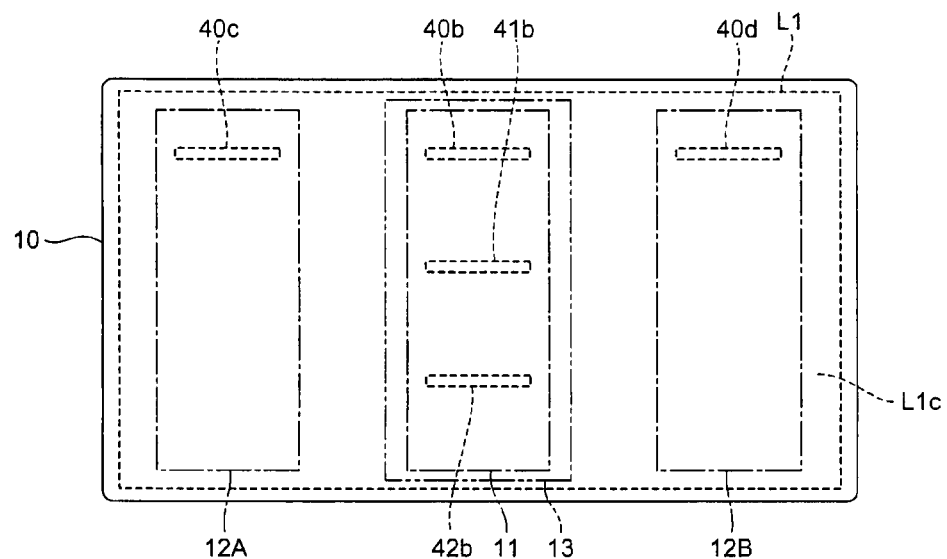
FIG. 3 is a view for explaining the structure of conductors, insulator, and terminal electrodes arranged on a first side face of the multilayer capacitor in accordance with the embodiment.
Figure 4:
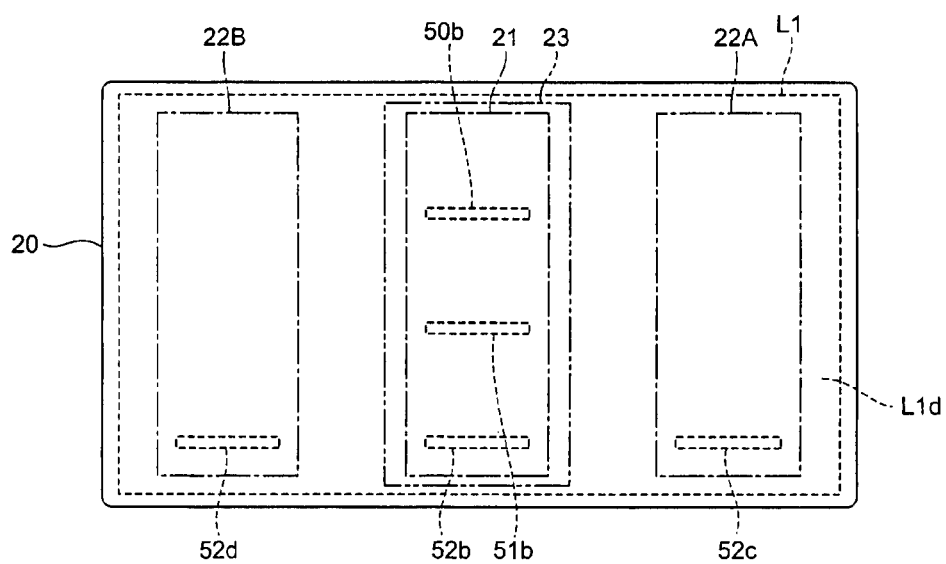
FIG. 4 is a view for explaining the structure of conductors, insulator, and terminal electrodes arranged on a second side face of the multilayer capacitor in accordance with the embodiment.
Figure 6:
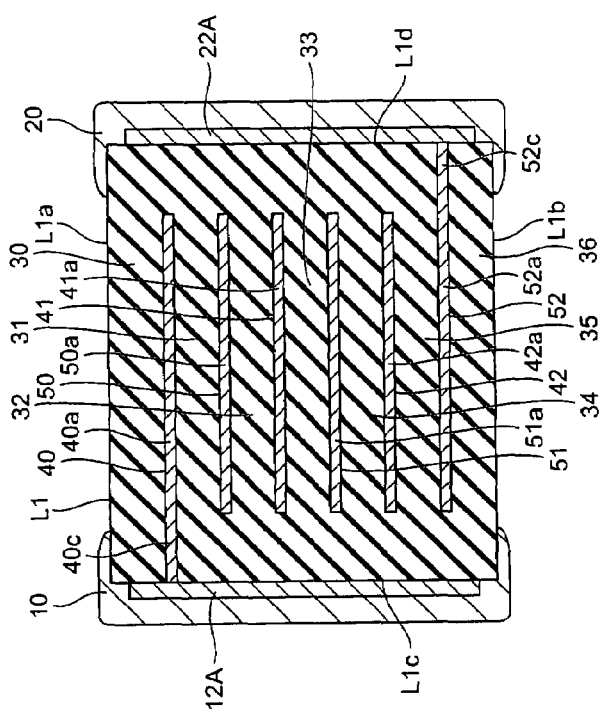
FIG. 6 is a view for explaining the structure of the multilayer capacitor at the cross section taken along the line VI-VI of FIG. 1.
Figure 5:
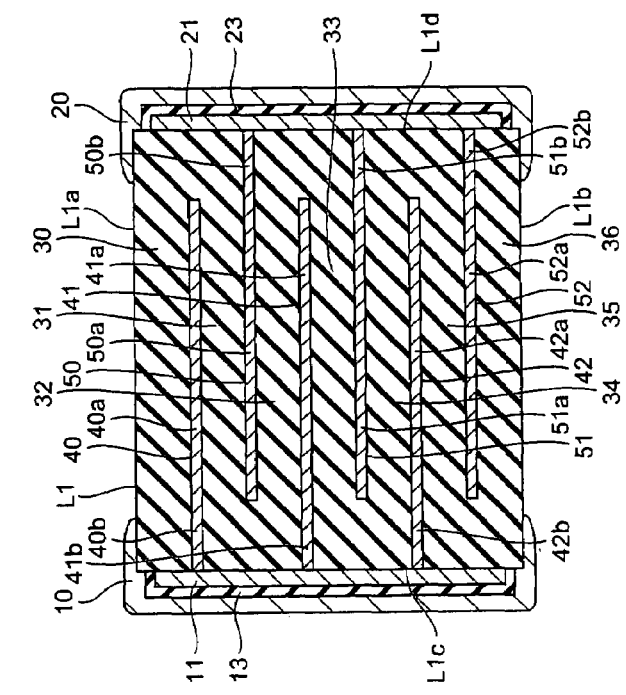
FIG. 5 is a view for explaining the structure of the multilayer capacitor at the cross section taken along the line V-V of FIG. 1.

The structure of a multilayer capacitor C1 in accordance with the embodiment will be explained with reference to FIGS. 1 to 6. FIG. 1 is a perspective view of the multilayer capacitor in accordance with the embodiment. FIG. 2 is an exploded perspective view of the capacitor body included in the multilayer capacitor in accordance with the embodiment. FIG. 3 is a view for explaining the structure of connecting conductor, insulator, base conductors, and first terminal electrode arranged on a first side face of the multilayer capacitor in accordance with the embodiment. FIG. 4 is a view for explaining the structure of connecting conductor, insulator, base conductors, and second terminal electrode in the multilayer capacitor in accordance with the embodiment. FIG. 5 is a view for explaining the structure of the multilayer capacitor at the cross section taken along the line V-V of FIG. 1. FIG. 6 is a view for explaining the structure of the multilayer capacitor at the cross section taken along the line VI-VI of FIG. 1.

As shown in FIG. 1, the multilayer capacitor C1 in accordance with the embodiment comprises a capacitor body L1, first and second connecting conductors 11, 21, first and second base conductors 12A, 12B, 22A, 22B, first and second insulators 13, 23, and first and second terminal electrodes 10, 20 which are arranged on the outer surface of the capacitor body L1.

As shown in FIG. 1, the capacitor body L1 is formed like a rectangular parallelepiped and has oblong first and second main faces L1a, L1b opposing each other; first and second side faces L1c, L1d extending in the longer side direction of the first and second main faces L1a, L1b so as to connect the first and second main faces L1a, L1b to each other and opposing each other; and third and fourth side faces L1e, L1f extending in the shorter side direction of the first and second main faces L1a, L1b so as to connect the first and second main faces L1a, L1b to each other and opposing each other.

As shown in FIG. 2, the capacitor body L1 is a multilayer body formed by laminating a plurality of (7 in this embodiment) insulator layers 30 to 36 in the opposing direction of the first and second main faces L1a, L1b. Each of the insulator layers 30 to 36 is constituted by a sintered body of a ceramic green sheet containing an insulator ceramic, for example. In the actual multilayer capacitor C1, the insulator layers 30 to 36 are integrated to such an extent that their boundaries are indiscernible.

A plurality of (3 each in this embodiment) first and second inner electrodes 40 to 42, 50 to 52 are arranged within the capacitor body L1. The first and second inner electrodes 40 to 42, 50 to 52 are alternately arranged within the capacitor body L1 such that each adjacent pair of the electrodes oppose each other with at least one of the plurality of insulator layers 30 to 36 therebetween. Each of the inner electrodes 40 to 42, 50 to 52 is constituted by a sintered body of a conductive paste (e.g., conductor paste mainly composed of Ni or Ag/Pd), for example.

The first inner electrodes 40 to 42 include rectangular main electrode portions 40a to 42a whose longer side direction is the longer side direction of the first and second main faces L1a, L1b of the capacitor body L1, and first lead portions 40b to 42b extending from the main electrode portions 40a to 42a so as to expose respective ends to the first side face L1c. The first lead portions 40b to 42b extend from near the center of the longer sides of their corresponding main electrode portions 40a to 42a on the first side face L1c side to the first side face L1c.

Among the first inner electrodes 40 to 42, one first inner electrode 40 further includes second lead portions 40c, 40d extending from the main electrode portion 40a so as to expose respective ends to the first side face L1c. The second lead portion 40c extends from the third side face L1e side of the longer side facing the first side face L1c in the main electrode portion 40a to the first side face Lic. The second lead portion 40d extends from the fourth side face L1f side of the longer side facing the first side face L1c in the main electrode portion 40a to the first side face L1c.

In the first inner electrode 40, the second lead portion 40c, first lead portion 40b, and second lead portion 40d are arranged in this order from the third side face L1e side to fourth side face L1f side of the capacitor body L1.

The second inner electrodes 50 to 52 include rectangular main electrode portions 50a to 52a whose longer side direction is the longer side direction of the first and second main faces L1a, L1b of the capacitor body L1, and third lead portions 50b to 52b extending from the main electrode portions 50a to 52a so as to expose respective ends to the second side face L1d. The third lead portions 50b to 52b extend from near the center of the longer sides of their corresponding main electrode portions 50a to 52a on the second side face L1d side to the second side face L1d.

Among the second inner electrodes 50 to 52, one second inner electrode 52 further includes fourth lead portions 52c, 52d extending from the main electrode portion 52a so as to expose respective ends to the second side face L1d. The fourth lead portion 52c extends from the third side face L1e side of the longer side facing the second side face L1d in the main electrode portion 52a to the second side face L1d. The fourth lead portion 52d extends from the fourth side face L1f side of the longer side facing the second side face L1d in the main electrode portion 52a to the second side face L1d.

In the second inner electrode 52, the fourth lead portion 52c, third lead portion 52b, and fourth lead portion 52d are arranged in this order from the third side face L1e side to fourth side face L1f side of the capacitor body L1.

The main electrode portion 40a of the first inner electrode 40 and the main electrode portion 50a of the second inner electrode 50 oppose each other with the insulator layer 31 therebetween. The main electrode portion 41a of the first inner electrode 41 and the main electrode portion 50a of the second inner electrode 50 oppose each other with the insulator layer 32 therebetween. The main electrode portion 41a of the first inner electrode 41 and the main electrode portion 51a of the second inner electrode 51 oppose each other with the insulator layer 33 therebetween. The main electrode portion 42a of the first inner electrode 42 and the main electrode portion 51a of the second inner electrode 51 oppose each other with the insulator layer 34 therebetween. The main electrode portion 42a of the first inner electrode 42 and the main electrode portion 52a of the second inner electrode 52 oppose each other with the insulator layer 35 therebetween.

As shown in FIG. 3, the first connecting conductor 11, first base conductors 12A, 12B, first insulator 13, and first terminal electrode 10 are arranged on the first side face L1c. The first connecting conductor 11 is arranged on the first side face L1c such as to continuously cover all the ends of the first lead portions 40b to 42b of the first inner electrodes 40 to 42 exposed to the first side face L1c. The first connecting conductor 11 is arranged between the first side face L1c and first terminal electrode 10. The first connecting conductor 11 does not cover any of the ends of the second lead portions 40c, 40d exposed to the first side face L1c.

The first base conductor 12A is arranged on the first side face L1c under the first terminal electrode 10 so as to cover the end of the second lead portion 40c exposed to the first side face L1c. The first base conductor 12B is arranged on the first side face L1c under the first terminal electrode 10 so as to cover the end of the second lead portion 40d exposed to the first side face L1c. Namely, the first base conductors 12A, 12B are arranged between the first side face L1c and first terminal electrode 10. The first base conductors 12A, 12B are arranged on the first side face L1c so as not to overlap each other and the first connecting conductor 11.

The first insulator 13 is arranged on the first connecting conductor 11, i.e., between the first connecting conductor 11 and first terminal electrode 10, so as to cover the whole area of the first connecting conductor 11 without covering the ends of the second lead portions 40c, 40d of the first inner electrode 40 exposed to the first side face L1c. The first terminal electrode 10 is arranged such as to continuously cover the whole area of the first insulator 13 and all the areas of the first base conductors 12A, 12B. Therefore, the first terminal electrode 10 covers the ends of the second lead portions 40c, 40d of the first inner electrode 40 exposed to the first side face L1c.

As shown in FIG. 4, the second connecting conductor 21, second base conductors 22A, 22B, second insulator 23, and second terminal electrode 20 are arranged on the second side face L1d. The second connecting conductor 21 is arranged on the second side face L1d such as to continuously cover all the ends of the third lead portions 50b to 52b of the second inner electrodes 50 to 52 exposed to the second side face L1d. The second connecting conductor 21 is arranged between the second side face L1d and second terminal electrode 20. The second connecting conductor 21 does not cover any of the ends of the fourth lead portions 52c, 52d exposed to the second side face L1d.

The second base conductor 22A is arranged on the second side face L1d under the second terminal electrode 20 so as to cover the end of the fourth lead portion 52c exposed to the second side face L1d. The second base conductor 22B is arranged on the second side face L1d under the second terminal electrode 20 so as to cover the end of the fourth lead portion 52d exposed to the second side face L1d. Namely, the second base conductors 22A, 22B are arranged between the second side face L1d and second terminal electrode 20. The second base conductors 22A, 22B are arranged on the second side face L1d so as not to overlap each other and the second connecting conductor 21.

The second insulator 23 is arranged on the second connecting conductor 21, i.e., between the second connecting conductor 21 and second terminal electrode 20, so as to cover the whole area of the second connecting conductor 21 without covering the ends of the fourth lead portions 52c, 52d of the second inner electrode 52 exposed to the second side face L1d. The second terminal electrode 20 is arranged such as to continuously cover the whole area of the second insulator 23 and all the areas of second base conductors 22A, 22B. Therefore, the second terminal electrode 20 covers the ends of the fourth lead portions 52c, 52d of the second inner electrode 52 exposed to the second side face L1d.

FIG. 5 is a view for explaining the structure of the multilayer capacitor at the cross section taken along the line V-V of FIG. 1. As can be seen from FIG. 5, respective ends of the first lead portions 40b to 42b of the first inner electrodes 40 to 42 are mechanically connected to the first connecting conductor 11. Respective ends of the third lead portions 50b to 52b of the second inner electrodes 50 to 52 are mechanically connected to the second connecting conductor 21. It can also be understood from FIG. 5 that the first connecting conductor 11 is arranged between the first side face L1c and first insulator 13, while the first insulator 13 is arranged between the first connecting conductor 11 and first terminal electrode 10. It can further be recognized that the second connecting conductor 21 is arranged between the second side face L1d and second insulator 23, while the second insulator 23 is arranged between the second connecting conductor 21 and second terminal electrode 20.

FIG. 6 shows a view for explaining the structure of the multilayer capacitor at the cross section taken along the line VI-VI of FIG. 1. As can be seen from FIG. 6, an end of the second lead portion 40c of the first inner electrode 40 is mechanically connected to the first base conductor 12A. An end of the fourth lead portion 52c of the second inner electrode 52 is mechanically connected to the second base conductor 22A. Though not depicted, an end of the second lead portion 40d of the first inner electrode 40 is mechanically connected to the first base conductor 12B. An end of the fourth lead portion 52d of the second inner electrode 52 is mechanically connected to the second base conductor 22B.

It can also be understood from FIG. 6 that the first base conductor 12A is arranged between the first side face L1c and first terminal electrode 10. It can further be recognized that the second base conductor 22A is arranged between the second side face L1d and second terminal electrode 20. Though not depicted, the first base conductor 12B is arranged between the first side face L1c and first terminal electrode 10, while the second base conductor 22B is arranged between the second side face L1d and first terminal electrode 10.

Therefore, the first terminal electrode 10 is electrically connected to the second lead portions 40c, 40d of the first inner electrode 40 without the aid of other inner electrodes and the first connecting conductor 11. The second terminal electrode 20 is electrically connected to the fourth lead portions 52c, 52d of the second inner electrode 52 without the aid of other inner electrodes and the second connecting conductor 21.

The first terminal electrode 10 is electrically connected to the plurality of first inner electrodes 40 to 42 through the first connecting conductor 11. The second terminal electrode 20 is electrically connected to the plurality of second inner electrodes 50 to 52 through the second connecting conductor 21.

An example of method of manufacturing the multilayer capacitor C1 by forming the first connecting conductor, first insulator, first base conductors, and first terminal electrode for the capacitor body L1 of the multilayer capacitor C1 will now be explained with reference to FIGS. 7 and 8. For easier viewing, FIGS. 7 and 8 omit hatchings.

Figure 7:
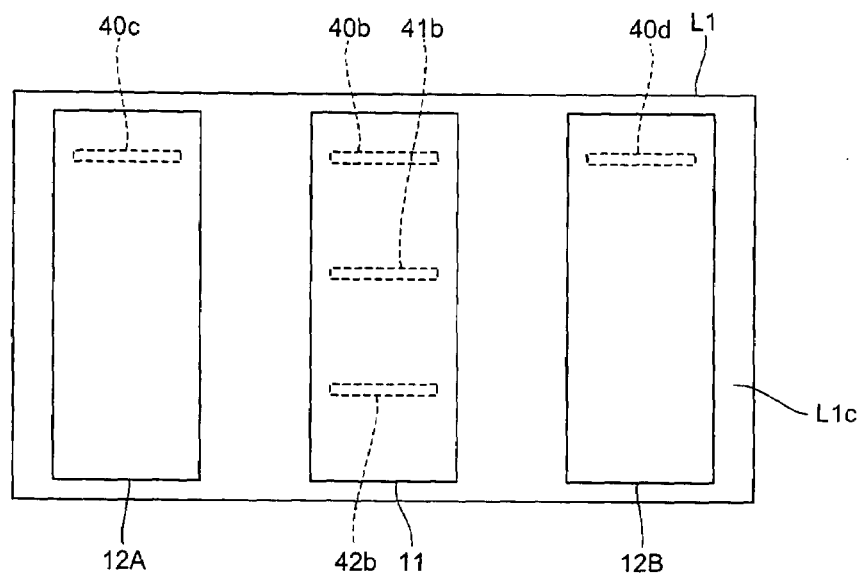
FIG. 7 is a view for explaining a method of manufacturing first terminal electrode members of the multilayer capacitor in accordance with the embodiment on the capacitor body.
Figure 8:
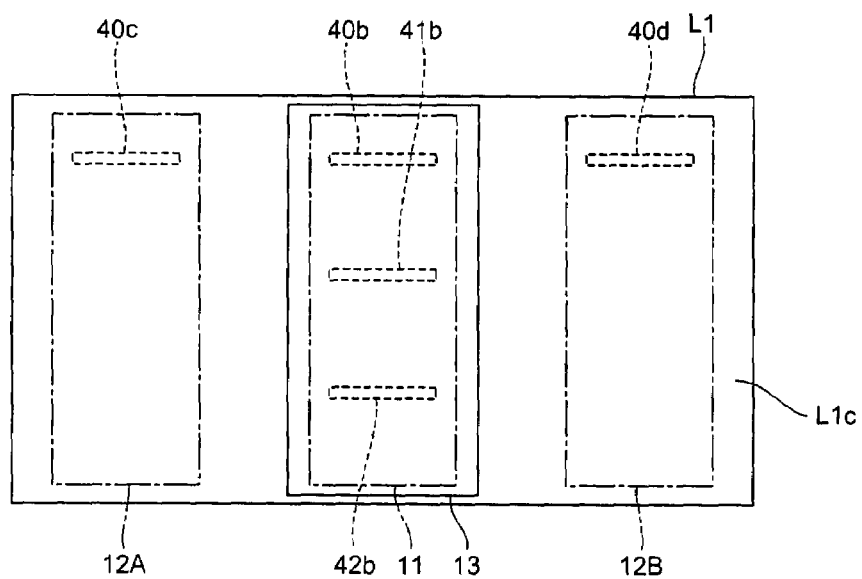
FIG. 8 is a view for explaining the method of manufacturing the first terminal electrode members of the multilayer capacitor in accordance with the embodiment on the capacitor body.

First, as shown in FIG. 7, the first connecting conductor 11 and first base conductors 12A, 12B are formed on the first side face L1c of the capacitor body L1. The first connecting conductor 11 is formed by applying a conductor paste onto the first side face L1c such as to continuously cover all the exposed portions of the first lead portions 40b to 42b of the first inner electrodes 40 to 42, and then heating (baking) the paste. The first base conductor 12A is formed by applying a conductor paste onto the first side face L1c such as to cover the exposed end of the second lead portion 40c of the first inner electrode 40, and then baking the paste. The first base conductor 12B is formed by applying a conductor paste onto the first side face L1c such as to cover the exposed end of the second lead portion 40d of the first inner electrode 40, and then baking the paste. Employed as the conductor paste is one mainly composed of Cu, Ni, or Ag, for example. Such baking forms alloys between the first lead portions 40b to 42b of the first inner electrodes 40 to 42 and the first connecting conductor 11, and between the second lead portions 40c, 40d of the first inner electrode 40 and the first base conductors 12A, 12B, whereby electric connections between these lead portions and connecting conductors become more reliable.

Next, the first insulator 13 is formed on the first connecting conductor 11. The first insulator 13 is formed by applying an insulator paste (mainly composed of glass, ceramics, or a resin, for example) onto the first connecting conductor 11 so as to cover the whole area thereof, and baking (when the insulator paste is mainly composed of glass or ceramics, for example) or drying (when the insulator paste is mainly composed of a resin, for example) thus applied paste. The first insulator 13 may also be formed by oxidizing the surface of the conductor paste applied for forming the first connecting conductor 11.

Subsequently, the first terminal electrode 10 is formed on the first insulator 13 and first base conductors 12A, 12B. The first terminal electrode 10 is formed by applying a conductor paste (mainly composed of Cu, Ni, Ag, or a conductive resin, for example) onto the first side face L1c such as to continuously cover the first insulator 13 and both of the first base conductors 12A, 12B, and baking (when the conductor paste is mainly composed of Cu, Ni, or Ag, for example) or drying (when the conductor paste is mainly composed of a resin, for example) thus applied conductor paste. A plating layer may be formed on the baked or dried first terminal electrode 10 when necessary. The foregoing forms the first terminal electrode 10 on the capacitor body L1.

In the multilayer capacitor C1, the first lead portions 40b to 42b of the first inner electrodes 40 to 42 are mechanically connected to the first connecting conductor 11. Therefore, the first inner electrodes 40 to 42 are electrically connected to each other through the first connecting conductor 11.

The first connecting conductor 11 is covered with the first insulator 13. Therefore, the first connecting conductor 11 is electrically insulated from the first terminal electrode 10 connected to a land pattern formed on a substrate or the like. On the other hand, only the first inner electrode 40 has the second lead portions 40c, 40d and is electrically connected to the first terminal electrode 10 without the aid of other inner electrodes and the first connecting conductor 11. Namely, the other first inner electrodes 41, 42 are electrically connected to the first terminal electrode 10 through the first inner electrode 40 and first connecting conductor 11.

As a result, the multilayer capacitor C1 can enhance the equivalent series resistance.

The first and second terminal electrodes 10, 20 are respectively arranged on the first and second side faces L1c, L1d extending in the longer side direction of the first and second main faces L1a, L1b and opposing each other. The distance between the first and second terminal electrodes 10, 20 thus becomes shorter in the multilayer capacitor C1, whereby the current path in the multilayer capacitor C1 becomes relatively short. As a consequence, the multilayer capacitor C1 can reduce the equivalent series inductance.

Therefore, the multilayer capacitor C1 can enhance the equivalent series resistance while keeping the equivalent series inductance from increasing.

In the multilayer capacitor C1, the first insulator 13 is arranged between the first connecting conductor 11 and first terminal electrode 10. Consequently, even when the first and second terminal electrodes 10, 20 are mounted such as to be connected as they are to land patterns formed on a substrate or the like, the above-mentioned effect (enhancing the equivalent series resistance while keeping the equivalent series inductance from increasing) can be exhibited. Therefore, the multilayer capacitor C1 can be connected to common substrate circuits and the like for mounting typical two-terminal capacitors, thus achieving versatility in connection with substrates and the like.

In the multilayer capacitor C1, the second connecting conductor 21, second base conductors 22A, 22B, and second insulator 23 are arranged between the second side face L1d and second terminal electrode 20. Such an arrangement also allows the multilayer capacitor C1 to enhance the equivalent series resistance while keeping the equivalent series inductance from increasing. As a result, the multilayer capacitor C1 can enhance the equivalent series resistance while further keeping the equivalent series inductance from increasing.

Though a preferred embodiment of the present invention is explained in the foregoing, the present invention is not necessarily limited to the above-mentioned embodiment, but can be modified in various ways within the scope not deviating from the gist thereof.

For example, the numbers of laminated insulator layers 30 to 36 and inner electrodes 40 to 42, 50 to 52 are not limited to those stated in the above-mentioned embodiment. The number and position in the laminating direction of the first inner electrodes having second lead portions and being electrically connected to the first terminal electrode 10 without the aid of other inner electrodes and connecting conductors are not limited to those stated in the above-mentioned embodiment. The number and position in the laminating direction of the second inner electrodes having fourth lead portions and being electrically connected to the second terminal electrode 20 without the aid of other inner electrodes and connecting conductors are not limited to those stated in the above-mentioned embodiment.

The numbers and positions of the first and second lead portions owned by the first inner electrode 40 are not limited to those stated in the above-mentioned embodiment. The numbers and positions of the first and second lead portions owned by the second inner electrode 52 are not limited to those stated in the above-mentioned embodiment.

The first and second connecting conductors 11, 21 are not limited to the numbers stated in the above-mentioned embodiment, but may be provided by one each or two or more each, for example. The first and second connecting conductors 11, 21 may be provided by numbers different from each other. The numbers of the first and second insulators 13, 23 are not limited to those stated in the above-mentioned embodiment.

The number of each species of the first and second base conductors 12A, 12B, 22A, 22B is not required to be 2, but may be 1 or 3 or more each. One or both species of the first and second base conductors 12A, 12B, 22A, 22B may be omitted. The second connecting conductor 21, second insulator 23, and second base conductors 22A, 22B may be omitted.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A multilayer capacitor comprising:
   a rectangular parallelepiped capacitor body having oblong first and second main faces opposing each other, first and second side faces extending in a longer side direction of the first and second main faces, connecting the first and second main faces to each other and opposing each other, and third and fourth side faces extending in a shorter side direction of the first and second main faces, connecting the first and second main faces to each other and opposing each other, a plurality of insulator layers being laminated in an opposing direction of the first and second main faces;
   a plurality of first inner electrodes arranged within the capacitor body;
   a plurality of second inner electrodes alternately arranged with the plurality of first inner electrodes within the capacitor body such that each pair of the first and second inner electrodes adjacent to each other oppose each other with at least one of the plurality of insulator layers therebetween;
   a first terminal electrode electrically connected to the plurality of first inner electrodes;
   a second terminal electrode electrically connected to the plurality of second inner electrodes;
   a connecting conductor electrically connected to the plurality of first inner electrodes; and
   an insulator arranged between the first terminal electrode and connecting conductor;
   wherein the insulator covers the whole area of the connecting conductor;
   wherein the second terminal electrode is arranged on the second side face of the capacitor body;
   wherein each of the first inner electrodes includes a main electrode portion and a first lead portion extending from the main electrode portion;
   wherein an end of each first lead portion is exposed to the first side face;
   wherein at least one first inner electrode out of the plurality of first inner electrodes further includes a second lead portion extending from the main electrode portion;
   wherein an end of the second lead portion is exposed to the first side face;
   wherein the connecting conductor is arranged between the first terminal electrode and first side face wherein the connecting conductor continuously covers all the ends of the first lead portions of the plurality of first inner electrodes exposed to the first side face of the capacitor body without covering the end of the second lead portion of the at least one first inner electrode exposed to the first side face of the capacitor body, and be mechanically connected to the ends of the first lead portions;
   wherein the insulator is kept from covering the end of the second lead portion of the at least one first inner electrode exposed to the first side face of the capacitor body; and
   wherein the first terminal electrode is arranged on the first side face, continuously cover the whole area of the insulator and the end of the second lead portion of the at least one first inner electrode exposed to the first side face, and is electrically connected to the second lead portion of the first inner electrode.

2. A multilayer capacitor according to claim 1, further comprising a base conductor mechanically connected to the end of the second lead portion of the at least one first inner electrode exposed to the first side face;
   wherein the base conductor is arranged between the first side face and first terminal electrode and covers the end of the second lead portion of the first inner electrode exposed to the first side face without overlapping the connecting conductor on the first side face.

* * * * *